Dec. 23, 1958 T. W. BEYER ET AL 2,865,585
UNIVERSAL JACKING SUPPORT FOR ENGINES AND TRANSMISSIONS
Filed March 15, 1954 2 Sheets-Sheet 1

INVENTOR.
THOMAS W. BEYER
BY JACK E. HARVEY

George B. White
ATTY

Dec. 23, 1958   T. W. BEYER ET AL   2,865,585
UNIVERSAL JACKING SUPPORT FOR ENGINES AND TRANSMISSIONS
Filed March 15, 1954   2 Sheets-Sheet 2

INVENTOR.
THOMAS W. BEYER
JACK E. HARVEY
BY George B. White
ATTY.

United States Patent Office 2,865,585
Patented Dec. 23, 1958

2,865,585
UNIVERSAL JACKING SUPPORT FOR ENGINES AND TRANSMISSIONS

Thomas W. Beyer and Jack E. Harvey, San Rafael, Calif.

Application March 15, 1954, Serial No. 416,274

5 Claims. (Cl. 248—3)

This invention relates to universal jacking support for engines and transmission.

The primary object of this invention is to provide a universally adjustable support which is easily adjustable to fit across the frame of automobiles and which is adapted to lock securely upon such frames, and has a jacking element thereon so arranged as to form a positive motor support for allowing the withdrawal of the drive shaft, torque tube and the transmission of such automobiles without dropping down the engine; the said device can be easily adapted to also support the transmission in position.

The advantages of the invention are: the small number of elements which can be adjustably assembled and which can be quickly and securely clamped upon the automobile frame; adjustability to the various widths of automobile frames; the transverse telescoping connection between the elements to allow longitudinal adjustment to fit any automobile frame; the modified arrangement for the jacking support for engagement at will with the transmission casing for holding the same in place; simplicity of structure and operation, lightness and the elimination of the need for floor jacks.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figure 1:
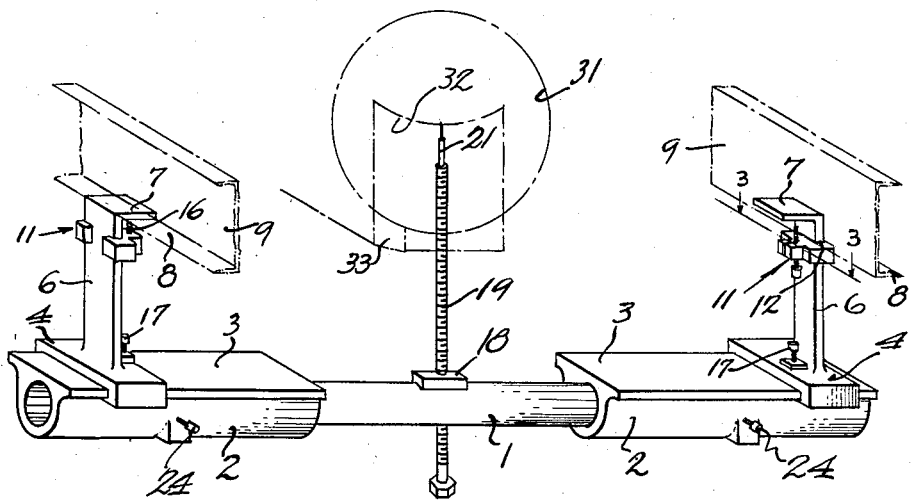
Fig. 1 is a perspective view of the preferred form of the jack device in operative position.

In carrying out our invention we make use of a bar 1 the ends of which are telescoped respectively into a bracket sleeve 2. Each bracket sleeve 2 has on its top a flat bracket flange 3 on which is slidably held the base 4 of a clamping arm 6. Each end of the base 4 extends over and around the adjacent edge of the top flange 3 so as to slidably embrace the outer edges of the top flange 3.

On the top of each standard 6 is a right angle flange 7 which operates as a fixed clamping jaw and is adapted to be placed upon the flange 8 of a channel frame 9 of the usual automobile.

On the arm 6 is a movable clamp 11 which is made of two sections, each section having a channel 12 formed therein to extend over the opposite edges of the arm 6 and slidably engage the same. The two sections of the clamp 11 are held together by a usual screw 13 laterally extended through the aligned ears 14. Through one of the ears 14 extends vertically a set screw 16 upwardly so as to engage firmly the underside of the flange 8 of the channel frame 9.

This arm 6 is also adjustable longitudinally on the flange 3 of the bracket sleeve by sliding it in position, and it can be locked in adjusted position by a vertical set screw 17 extended through said base 4 and bearing against the top of the flange 3.

On about the center or middle of the bar 1 is provided a boss 18. A jack screw 19 is threaded through the bar 1 and boss 18 and terminates in a supporting tip 21 for engagement with the portion of the engine between its fly wheel casing and crank case.

The bar 1 has a plurality of circular grooves 22 thereon in spaced relation at each end which can be engaged respectively by the reduced end of a set screw 24 extended through a side boss 26 of the bracket sleeve 2.

For the purpose of supporting a transmission when needed in some repair jobs, a pair of transmission support arms 27 are provided. Each arm 27 has a base 28 of the same type, as the base 4 heretofore described, slidably adjustable upon the top flange 3 of the sleeve bracket 2 and adapted to be fixed in adjusted position by a screw 29 in the manner heretofore described in connection with the clamping arm 6. This arm 27 is higher than the clamping arm 6 so as to extend above the channel frames of the automobile and to the transmission casing so as to prevent the transmission from turning.

Figure 2:
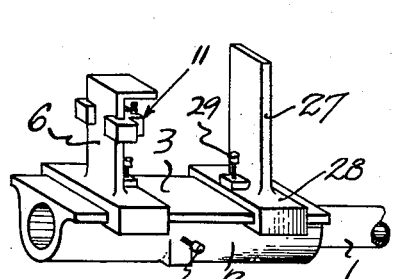
Fig. 2 is a perspective fragmental view of one end of said device showing the elements therein for the support of the transmission casing.
Figure 3:
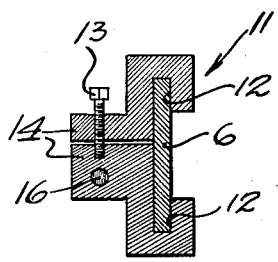
Fig. 3 is a sectional view of the clamping element, the section being taken on the line 3—3.
Figure 4:
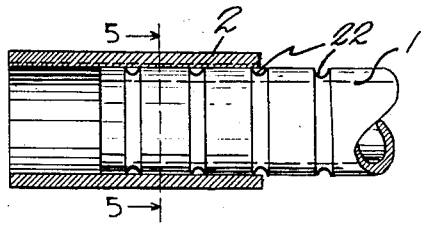
Fig. 4 is a fragmental sectional view of the telescoping connection between the central rod and the end sleeve or bracket.
Figure 5:
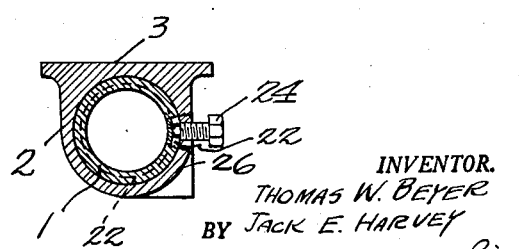
Fig. 5 is a cross sectional view of said end the section being taken on line 5—5 of Fig. 4.

It is to be noted that the arm 6 shown in Fig. 2 is shorter than the arm 6 in Fig. 1. This is for the purpose of illustrating that variable arrangements can be made for automobiles of different type by providing arms of suitable dimensions.

In operation the bracket sleeves 2 are slipped upon the respective opposite ends of the bar 1 and symmetrically arranged for the particular width of the frame. Then by tightening set screws 24 into the next adjacent grooves 22, the length of the support under the frame is determined, although the bar 1 is still permitted to rotate. Then the arms 6 and the bases 4 are slipped toward one another until their respective top flanges 4 rest upon the lower flanges 8 of the adjacent channel flanges 9, and thus the unit is hung from the channel frame of the automobile. In this position the screws 17 are tightened to set the arms at the adjusted width corresponding to the width of the automobile. Thereafter the clamping screws 13 are loosened so that the clamps 11 can be slid to the proper distance toward the underside of the channel flanges 8 and when reaching a suitable clamping position the screws 13 are tightened to hold the clamps 11 in said position. Thereafter by turning the clamping screws 16 the engagement between the arms 6 and the flanges 8 of the channels 9 can be firmly secured. When this accurate adjustment is reached the center of the bar or its jack screw 19 is aligned with the right position behind the fly wheel casing indicated at 31 so that the tip 21 of the jack screw 19 can be set against the neck or casing 32 between the fly wheel casing 31 and the crank case 33. In this manner the engine is positively supported and the drive shaft, torque tube, or the transmission can be removed without dropping the engine. This is a great advantage in repair work on cars and it facilitates greatly the work without the use of floor jack and the like.

If it is desired to prevent the transmission from turning, then the transmission supporting arms 27 are placed upon the flange 3 of the bracket sleeve 2 and are slid in position to be in alignment with the transmission casing and secured in that position by the set screws 29.

Figure 6:
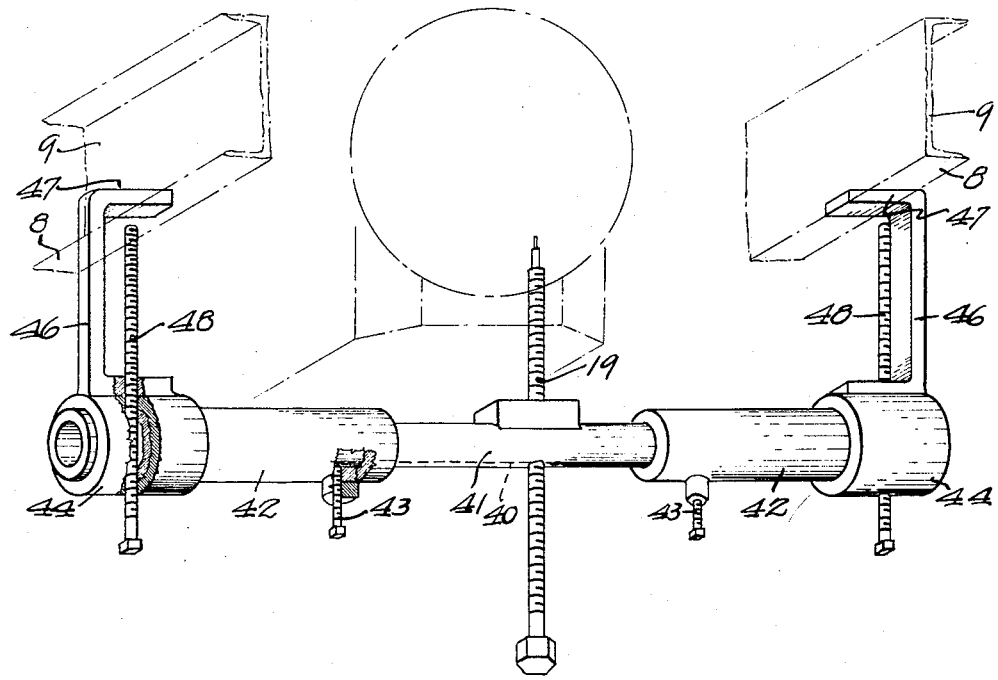
Fig. 6 is a perspective view of a modified form of the adjustable telescoping jack.
Figure 7:
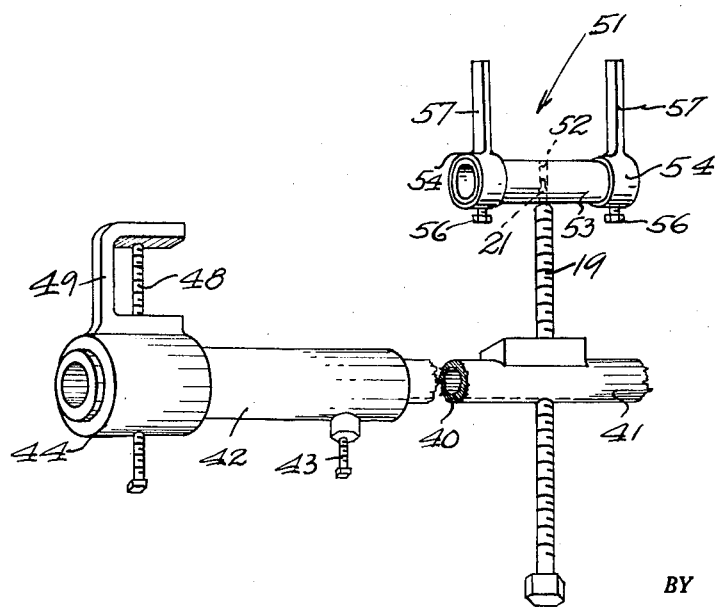
Fig. 7 is a fragmental perspective view of an adaptation of said modified device for supporting a transmission.

In the modified form of the invention shown in Figs. 6 and 7 a central bar 41 is telescoped at each end into a sleeve 42 which latter can be secured in any adjusted telescoped position by a set screw 43. Each sleeve 42 in turn is telescoped into a bracket sleeve 44 at each end thereof. On the bracket sleeve 44 is a bracket arm 46, the top flange 47 of which is adapted to extend over the bottom flange 8 of the channel 9 to hang the unit from said frame flange. A clamping screw 48 is threaded through the bracket sleeve 44 and also through the end of the sleeve 42 so as to clamp against the underside of the frame flange 8 to clamp the unit in position.

The central jack screw 19 in this form operates the same way as in the preferred form heretofore described. The longitudinal adjustment in this manner is accomplished as previously described, but it is primarily through the telescoping of the central bar 41 in the sleeve 42.

As shown in Fig. 7 this modified unit can also be made with shorter supporting arms 49. As shown in Fig. 7 the transmission support in this form is accomplished by a U-shaped yoke 51, a central hole 52 of which is rotatably engaged by the tip 21 of the jack screw 19. On each end of a horizontal tube 53 of the yoke is a hub 54 adjustable longitudinally on the tube 53, which hub 54 is held in adjusted position by a set screw 56. From each hub 54 extends a yoke arm 57 for engagement with transmission or engine to be supported.

The central bar 41 of the main jack is held against rotation by a key slot 40 with which the set screw 43 is engaged as heretofore described.

In both forms of the devices the arms can be hung in position on the lower frame flange on the opposite sides of an automobile permitting the opposite sleeves to be symmetrically slid upon the central bar 41 so that the unit is adjusted to the width of the car, then slid along the general flange 8 to a position of alignment either with the engine portion or with the transmission as required, and clamped into fixed position on said flange as well as the bar can be then clamped into the adjusted position holding the jack screw 19 at the proper angle. Then by screwing the jack screw 19 the engine can be jacked up as heretofore described. For supporting the transmission either the arms 27 of the first form or the yoke 51 of the second form may be utilized as desired. The unit is simple; it can be quickly set up and assembled on the frame of an automobile and it is eminently adapted for its purposes.

We claim:

1. In an adjustable engine and transmission support of the character described, a jack bar, a bracket sleeve telescoped on each end of said bar, an arm extended upwardly from each bracket sleeve, a flange on each arm adapted to rest upon the usual flange of an automobile frame so as to hang from said frame, and a jack screw threadedly extended through the intermediate portion of the bar between said bracket sleeves and engageable with the engine of said automobile, and a base on each arm longitudinally slidably engaging said bracket sleeve.

2. In an adjustable engine and transmission support of the character described, a jack bar, a bracket sleeve telescoped on each end of said bar, an arm extended upwardly from each bracket sleeve, a flange on each arm adapted to rest upon the usual flange of an automobile frame so as to hang from said frame, and a jack screw threadedly extended through the intermediate portion of the bar between said bracket sleeves and engageable with the engine of said automobile, a base on each arm longitudinally slidably engaging said bracket sleeve, and means to clamp said arms to the respective channel flanges.

3. In an adjustable engine and transmission support of the character described, a jack bar, a bracket sleeve telescoped on each end of said bar, an arm extended upwardly from each bracket sleeve, a flange on each arm adapted to rest upon the usual flange of an automobile frame so as to hang from said frame, and a jack screw threadedly extended through the intermediate portion of the bar between said bracket sleeves and engageable with the engine of said automobile, a base on each arm longitudinally slidably engaging said bracket sleeve, and means to clamp said arms to the respective channel flanges and means to hold said bar rotatably in adjusted position in the respective bracket sleeves.

4. In an adjustable engine and transmission support of the character described, a jack bar, a bracket sleeve telescoped on each end of said bar, an arm extended upwardly from each bracket sleeve, a flange on each arm adapted to rest upon the usual flange of an automobile frame so as to hang from said frame, and a jack screw threadedly extended through the intermediate portion of the bar between said bracket sleeves and engageable with the engine of said automobile, a base on each arm longitudinally slidably engaging said bracket sleeve, and means to clamp said arms to the respective channel flanges, means to hold said bar rotatably in adjusted position in the respective bracket sleeves, and a transmission supporting element adjustably supported on each bracket sleeve and extending above the level of the ends of said flanges for engaging the usual transmission in an automobile.

5. In an adjustable engine and transmission support of the character described, a jack bar, a bracket sleeve telescoped on each end of said bar, an arm extended upwardly from each bracket sleeve, a flange on each arm adapted to rest upon the usual flange of an automobile frame so as to hang from said frame, and a jack screw threadedly extended through the intermediate portion of the bar between said bracket sleeves and engageable with the engine of said automobile, means to clamp said arms to the respective channel flanges, each bracket sleeve having a flat flange on its top, a base on said arm slidably held on each flat flange, means to releasably secure said base in adjusted position on said flat flange, and clamping means on said arm to clamp said arm to an automobile frame.

References Cited in the file of this patent

UNITED STATES PATENTS

| | | |
|---|---|---|
| 227,634 | Loehner | May 18, 1880 |
| 1,481,503 | Carswell | Jan. 22, 1924 |
| 1,600,835 | Manley | Sept. 21, 1926 |
| 1,826,493 | Bahrman | Oct. 6, 1931 |
| 1,982,682 | Masse | Dec. 4, 1934 |
| 2,546,722 | Carter | Mar. 27, 1951 |